United States Patent Office 2,697,118
Patented Dec. 14, 1954

2,697,118

TOTALLY HYDROXYPROPYLATED ALKYLENE DIAMINES

Lester G. Lundsted, Grosse Ile, and Walter F. Schulz, Wyandotte, Mich., assignors to Wyandotte Chemicals Corporation, Wyandotte, Mich., a corporation of Michigan No Drawing. Application July 28, 1953,
Serial No. 370,885

7 Claims. (Cl. 260—584)

The totally hydroxypropylated alkylene diamines of this invention are represented by the following chemical structure:

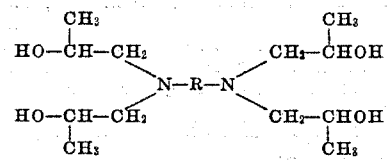

wherein: R is an alkylene radical containing from 2 to 6 carbon atoms. These compounds constitute an interesting new class of chemicals having a dual chemical personality in that they are both polyhydric alcohols and high-boiling bases. They are valuable humectants for use in conjunction with such products as cellophane and, because of their high-boiling points and mildly basic characteristics, are valuable absorbents for removing acidic components such as carbon dioxide and hydrogen sulfide from hydrogen and other gases.

These compounds are prepared by condensing the calculated quantity of propylene oxide with an alkylene diamine. Typical of the alkylene diamines that can be totally hydroxypropylated to form the compounds of the present invention are ethylene diamine, propylene diamine, butylene diamine, trimethylene diamine and hexamethylene diamine.

An outstanding feature of the invention is the ease and facility with which the totally hydroxypropylated alkylene diamines can be prepared without the concomitant formation of undesired higher hydroxypropylated derivatives. The compound can be prepared in essentially quantitative yield by condensing propylene oxide with an alkylene diamine, with one mol of propylene oxide being employed for each amino hydrogen atom present in the diamine. Thus, 4 mols of propylene oxide are employed per mol of alkylene diamine.

The reaction is effected by introducing the calculated quantity of propylene oxide into the alkylene diamine, preferrably with stirring. A small quantity of water, as little as 0.5–1.0%, must be present in the diamine as it serves as a catalyst in the reaction. The alkylene diamines are commercially available as concentrated aqueous solutions, e. g. 65–80%, and we prefer to use solutions of this strength, although quite dilute aqueous solutions of the diamines, e. g. 10–20%, may be used if desired. If it should be desired to exclude water entirely from the reaction, an alcohol may be substituted therefore and will serve as the reaction catalyst.

The reaction may be run at a temperature from about 40° C. to about 200° C., with a preferred range being between about 50° C. and about 120° C. Either atmospheric or superatmospheric pressures, e. g. 1 to 5 atmospheres of propylene oxide, may be used in the reaction, with faster reaction rates being obtained under superatmospheric pressures.

A surprising feature of the process is that under the reaction conditions set forth propylene oxide reacts with amino hydrogen atoms to form totally hydroxypropylated alkylene diamines, but does not react to any measurable extent with the hydroxypropyl groups thereof to form undesired higher hydroxypropylated derivatives. Even the inadvertent introduction of excess propylene oxide in the process does not result in substantial hydroxypropylation of the desired product. In one laboratory run, which was made at about 80° C. and atmospheric pressure, excess propylene oxide was introduced, but would not react and was recovered by distillation.

The following examples are set forth to more clearly illustrate the principle and practice of the invention to those skilled in the art.

Example 1

Into a 3-neck, round-bottom flask equipped with a mechanical stirrer, reflux condenser, thermometer and propylene oxide feed inlet, there were placed 94.1 grams (1.57 mols) of ethylene diamine and 15.6 grams of water. The flask was purged with nitrogen to remove air and heated to 90° C. with stirring. Propylene oxide was then introduced into the ethylene diamine as fast as it would react until 367 grams (6.33 mols) of propylene oxide had reacted. Water was then removed from the product by vacuum stripping. The product, N,N,N',N' tetra(2-hydroxypropyl) ethylene diamine, was a viscous, amber-colored liquid.

Example 2

A total of 499 grams (4.3 mols) of hexamethylene diamine, as a 72.4% aqueous solution, was charged into the apparatus described in Example 1. A total of 983 grams (17 mols) of propylene oxide was added thereto over a period of 7 hours at an average reaction temperature of 90° C. and at atmospheric pressure. The water was removed by a vacuum stripping and the N,N,N',N' tetra(2 hydroxypropyl)hexamethylene diamine was distilled at 214–215° C. at 0.5 mm. of Hg. The product was a waxy white solid melting at 50–56° C.

Example 3

Three hundred twenty-one grams (5.7 mols) of ethylene diamine, as a 76% aqueous solution, was charged into a one-gallon stainless steel autoclave equipped with a stirrer, thermocouple, pressure gauge and reactant inlet tube whose outlet was directly under the stirrer. A total of 1341 grams (23.1 mols) of propylene oxide was added to the reaction mixture over a period of 2.3 hours at an average temperature of 68° C. and at an average operating pressure of 12 p. s. i. gauge. Water was removed by vacuum stripping and N,N,N',N' tetra(2 hydroxypropyl)ethylene diamine was obtained in a substantially quantitative yield.

An outstanding characteristic of the totally hydroxypropylated alkylene diamines is their remarkable thermal stability. It was noted in Example 2 that tetra(2 hydroxypropyl) hexamethylene diamine can be distilled at 214–215° C. at 0.5 mm. Hg to obtain a water-white distillate. Similarly, tetra (2 hydroxypropyl)ethylene diamine can be distilled at 184° C. at 0.5 mm. of Hg without decomposition. The thermal stability of these compounds is unexpected since a homologue of tetra(2 hydroxypropyl) ethylene diamine, viz. tetra(hydroxyethyl)ethylene diamine, decomposes when heated and cannot be distilled [see Sherlin et al., Chemical Abstracts 35, 5858 (1941)]. In comparing the chemical structures of tetra(2 hydroxylpropyl)ethylene diamine and tetra (hydroxyethyl)ethylene diamine it will be noted that the tetrahydroxyethyl compound contains primary hydroxyl groups, whereas the tetrahydroxypropyl compound contain secondary hydroxy groups. It is well known in organic chemistry that primary hydroxy groups are more stable to thermal decomposition than secondary hydroxyl groups and, consequently, it would be expected that the tetra(hydroxyethyl) alkylene diamines would be more thermally stable than the tetra(2 hydroxypropyl) alkylene diamines. In this case, however, the totally hydroxypropylated alkylene diamines are more thermally stable tthan their hydroxyethylated homologues. The thermal stability of the totally hydroxypropylated alkylene diamines is important in that it permits the manufacture of a water-white product, which is highly desired in many end uses of these products.

In continuing our investigation of the thermal stability of the compounds of this invention, it was discovered that esters of the claimed compounds were also more thermally stable than the esters of their hydroxyethylated homologues. To demonstrate this fact, the tetra-acetate ester of tetra(2 hydroxypropyl)ethylene diamine was prepared and distilled at 178–179° C. at 0.3 mm. Hg to give a water-white distillate. In contrast to this result, when the tetra-acetate ester of tetra(hydroxyethyl)ethylene diamine was distilled at 0.3 mm. Hg, a black distillate was obtained which distilled over a wide temperature range. This result was contrary to that expected, since accepted chemical theory indicates that esters of compounds containing primary hydroxyl groups should be more thermally stable than the esters of corresponding compounds containing secondary hydroxyl groups.

The symmetrical structure of the totally hydroxypropylated alkylene diamines, together with their reactive hydroxyl groups, makes them valuable intermediates in the preparation of pharmaceuticals, emulsifiers, surface active agents, polyester resins, agricultural chemicals, plasticizers, rubber accelerators, etc. For example, the hydrochloride salt of the monooleate ester of tetra(2 hydroxypropyl)ethylene diamine is an excellent emulsifying agent. This particular emulsifying agent is extremely useful, since emulsions prepared therewith can be easily resolved by simply adding a small quantity of base to the emulsion. It has also been observed that the tetra(2 hydroxypropyl)ethylene diamine salts of alkylarylsulfonates have excellent foaming and emulsifying properties. Other emulsifiers and surface active agents can be prepared by condensing ethylene oxide with the mono- and di-fatty acid esters of our totally hydroxypropylated alkylene diamines. Because of the basic nature of the amine group contained in their structure, these surface active agents have particular utility in acidic media. The compounds of the present invention are intermediates in the preparation of the polymeric surface active agents disclosed in the copending application of Lester G. Lundsted, Serial No. 349,283, filed April 16, 1953.

The esters and polyesters of the totally hydroxypropylated alkylene diamines have a number of important applications. For example, the acetate, 2-ethylhexyl and sebacate esters are excellent plasticizers for vinyl resins. A linear, water-soluble, polyester resin can be prepared by heating 2 mols of diglycolic acid with one mol of tetra(2 hydroxypropyl)ethylene diamine. This particular resin is an excellent binder for formulated alkylarylsulfonate detergents and may be employed in the preparation of non-tacky detergent bars. Tough, rubbery resins are obtained by heating two mols of adipic acid or phthalic anhydride with tetra(2 hydroxypropyl)ethylene diamine. Such resins have utility in protective coating compositions.

What is claimed is:

1. Totally hydroxypropylated alkylene diamines having the formula:

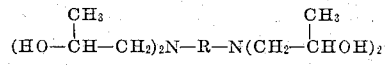

where: R is an alkylene radical containing from 2 to 6 carbon atoms.

2. Tetra(2 hydroxypropyl)ethylene diamine.

3. Tetra(2 hydroxypropyl)hexamethylene diamine.

4. A process for the manufacture of totally hydroxypropylated alkylene diamines, which comprises contacting an alkylene diamine whose alkylene group contains 2 to 6 carbon atoms, with propylene oxide, in the presence of water, at a temperature from about 40° C. to about 200° C., the mol ratio of propylene oxide to the amine being substantially 4 to 1.

5. A process for the manufacture of totally hydroxypropylated alkylene diamines, which comprises contacting an aqueous solution of an alkylene diamine whose alkylene group contains 2 to 6 carbon atoms with propylene oxide at a temperature from about 40° C. to about 120° C., the mol ratio of propylene oxide to amine being substantially 4 to 1.

6. The process of claim 5 in which the alkylene diamine is ethylene diamine.

7. The process of claim 5 in which the alkylene diamine is hexamethylene diamine.

References Cited in the file of this patent

UNITED STATES PATENTS

| Number | Name | Date |
|---|---|---|
| 2,248,729 | Ulrich et al. | July 8, 1941 |
| 2,256,806 | Kern | Sept. 23, 1941 |
| 2,262,738 | De Groote | Nov. 11, 1941 |
| 2,262,740 | De Groote | Nov. 11, 1941 |
| 2,342,649 | De Groote | Feb. 29, 1944 |

OTHER REFERENCES

Kitchen et al.: Jour. of Org. Chem. (1943), vol. 8, No. 4, pp. 342–3.